United States Patent
Pendleton et al.

(10) Patent No.: US 12,377,776 B2
(45) Date of Patent: Aug. 5, 2025

(54) TURN SIGNAL ASSIGNMENT FOR COMPLEX MANEUVERS

(71) Applicant: Motional AD LLC, Boston, MA (US)

(72) Inventors: Scott Drew Pendleton, Singapore (SG); Titus Chua, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/990,551

(22) Filed: Nov. 18, 2022

(65) Prior Publication Data

US 2024/0131984 A1 Apr. 25, 2024

Related U.S. Application Data

(60) Provisional application No. 63/417,962, filed on Oct. 20, 2022.

(51) Int. Cl.
  *B60Q 1/26* (2006.01)
  *B60Q 1/34* (2006.01)
  *B60Q 1/50* (2006.01)

(52) U.S. Cl.
  CPC ........... *B60Q 1/507* (2022.05); *B60Q 1/346* (2013.01); *B60Q 2800/10* (2022.05)

(58) Field of Classification Search
  CPC ..... B60Q 1/507; B60Q 1/346; B60Q 2800/10
  See application file for complete search history.

(56) References Cited

U.S. PATENT DOCUMENTS 6,356,189 B1 * 3/2002 Fujimaki ............... B60Q 1/508
                                        340/475
8,775,073 B2 * 7/2014 Denaro ................. B60W 50/14
                                        701/425
9,079,499 B1 * 7/2015 Raubvogel ............ B60Q 1/346
9,771,021 B1 * 9/2017 Lindsay ................ B60Q 1/525
10,011,216 B1 * 7/2018 Rovik .................. G06V 20/597
10,431,018 B1 * 10/2019 Fields .................... G06F 8/65

(Continued)

FOREIGN PATENT DOCUMENTS

EP          3517382       7/2019
WO     WO 2017/187931    11/2017

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Quang Pham

(74) *Attorney, Agent, or Firm* — Fish & Richardson P.C.

(57) ABSTRACT

Provided are methods for turn signal assignment in complex maneuvers, which can include receiving position information associated with a position of a vehicle. Some methods described also include determining, hierarchically and based at least on the position information, whether to activate a turn signal of a vehicle prior to activation of the turn signal based on a turn of the vehicle at a roadway intersection. Some methods described also include determining a time to activate the turn signal prior to the turn of the vehicle at the roadway intersection. Some methods described also include transmitting a control signal to activate the turn signal at the determined time. Systems and computer program products are also provided.

20 Claims, 11 Drawing Sheets

(56) References Cited

U.S. PATENT DOCUMENTS

| | | | | |
|---|---|---|---|---|
| 10,453,344 | B2* | 10/2019 | Ishii | G08G 1/162 |
| 10,738,961 | B1* | 8/2020 | Allen | F21S 43/255 |
| 11,320,826 | B2* | 5/2022 | Vora | G05D 1/228 |
| 11,378,956 | B2* | 7/2022 | Zhang | B60W 60/001 |
| 11,400,958 | B1* | 8/2022 | Fu | G06V 20/58 |
| 11,524,688 | B2* | 12/2022 | Kato | G01C 21/3602 |
| 11,603,115 | B1* | 3/2023 | Heckmann | B60W 30/181 |
| 11,697,410 | B2* | 7/2023 | Wang | B60Q 9/008 |
| | | | | 701/24 |
| 11,733,960 | B1* | 8/2023 | Karol | G08G 1/166 |
| | | | | 340/463 |
| 2002/0061226 | A1 | 5/2002 | Kodama | G08G 1/162 |
| | | | | 404/14 |
| 2004/0077285 | A1* | 4/2004 | Bonilla | H04N 7/181 |
| | | | | 446/491 |
| 2004/0143381 | A1* | 7/2004 | Regensburger | G01C 21/3602 |
| | | | | 701/1 |
| 2004/0233051 | A1* | 11/2004 | Madau | B60Q 1/40 |
| | | | | 340/476 |
| 2005/0200467 | A1* | 9/2005 | Au | B60Q 1/343 |
| | | | | 348/148 |
| 2006/0271286 | A1* | 11/2006 | Rosenberg | G01C 21/3647 |
| | | | | 701/431 |
| 2009/0237230 | A1* | 9/2009 | Ponziani | B60Q 1/346 |
| | | | | 340/457 |
| 2010/0308988 | A1* | 12/2010 | Ieda | B60Q 1/40 |
| | | | | 340/477 |
| 2011/0106376 | A1* | 5/2011 | Tijerina | B60Q 1/40 |
| | | | | 701/36 |
| 2012/0089300 | A1* | 4/2012 | Wolterman | B60Q 1/346 |
| | | | | 701/36 |
| 2012/0271510 | A1* | 10/2012 | Seymour | B60Q 1/46 |
| | | | | 701/36 |
| 2013/0110347 | A1* | 5/2013 | Ge | B60Q 1/346 |
| | | | | 701/36 |
| 2014/0052313 | A1* | 2/2014 | Wolterman | B60Q 1/40 |
| | | | | 701/2 |
| 2014/0058611 | A1* | 2/2014 | Borinato | G05D 1/0265 |
| | | | | 901/1 |
| 2014/0244109 | A1* | 8/2014 | Tetsuka | B60Q 1/40 |
| | | | | 701/36 |
| 2014/0309855 | A1* | 10/2014 | Tran | B60Q 1/346 |
| | | | | 701/36 |
| 2015/0022336 | A1* | 1/2015 | Mueller | B60Q 1/40 |
| | | | | 340/476 |
| 2015/0336508 | A1* | 11/2015 | Chiba | B60Q 9/008 |
| | | | | 701/45 |
| 2016/0114722 | A1* | 4/2016 | Kim | B60Q 1/42 |
| | | | | 701/36 |
| 2016/0311364 | A1* | 10/2016 | Fendt | B60Q 1/346 |
| 2017/0021829 | A1* | 1/2017 | Nishimura | B62D 6/00 |
| 2017/0076607 | A1* | 3/2017 | Linder | B60W 30/0956 |
| 2017/0166114 | A1* | 6/2017 | Kim | B62D 15/021 |
| 2017/0174123 | A1* | 6/2017 | Ogihara | B60Q 1/346 |
| 2018/0072326 | A1* | 3/2018 | Ichikawa | B60W 50/10 |
| 2018/0082203 | A1* | 3/2018 | Bender | G01C 21/3415 |
| 2018/0111611 | A1* | 4/2018 | MacNeille | B60W 30/18163 |
| 2018/0129206 | A1* | 5/2018 | Harada | B60W 50/082 |
| 2018/0147984 | A1* | 5/2018 | Himi | B60Q 9/008 |
| 2018/0162416 | A1* | 6/2018 | Honda | B60W 50/14 |
| 2018/0178721 | A1* | 6/2018 | Ikedo | B60R 16/0231 |
| 2018/0222381 | A1* | 8/2018 | Johnson | B60Q 1/0041 |
| 2018/0244195 | A1* | 8/2018 | Haight | G01S 13/867 |
| 2018/0259957 | A1* | 9/2018 | Charrow | G08G 1/167 |
| 2018/0275650 | A1* | 9/2018 | Nelson | B62J 50/25 |
| 2018/0284264 | A1* | 10/2018 | Chambers | G08G 1/096791 |
| 2019/0018421 | A1* | 1/2019 | Frazzoli | G08G 1/163 |
| 2019/0031091 | A1* | 1/2019 | Haushalter | B60Q 1/2607 |
| 2019/0077308 | A1* | 3/2019 | Kashchenko | G06F 3/012 |
| 2019/0084474 | A1* | 3/2019 | Ogihara | G06V 20/58 |
| 2019/0084585 | A1* | 3/2019 | Fritz | B60Q 9/00 |
| 2019/0193726 | A1* | 6/2019 | Ishikawa | B60Q 1/44 |
| 2019/0255989 | A1* | 8/2019 | Rowell | G06V 20/597 |
| 2019/0302768 | A1* | 10/2019 | Zhang | G05D 1/0088 |
| 2019/0315271 | A1* | 10/2019 | Tatara | G05D 1/0276 |
| 2020/0125106 | A1* | 4/2020 | Russell | B60W 30/165 |
| 2020/0130567 | A1* | 4/2020 | Taniguchi | B60Q 1/381 |
| 2020/0180636 | A1* | 6/2020 | Oh | B60W 30/09 |
| 2020/0189454 | A1* | 6/2020 | Boilevin | B60Q 1/543 |
| 2020/0247537 | A1* | 8/2020 | Nocon | G06F 9/30003 |
| 2020/0269745 | A1* | 8/2020 | Iwasaki | B60Q 1/346 |
| 2020/0324790 | A1* | 10/2020 | Kunz | G01C 21/3407 |
| 2020/0361455 | A1* | 11/2020 | Murakami | B60W 50/14 |
| 2020/0361489 | A1* | 11/2020 | Park | B60W 30/0956 |
| 2021/0018916 | A1* | 1/2021 | Thakur | G07C 5/08 |
| 2021/0046924 | A1* | 2/2021 | Caldwell | B60W 30/09 |
| 2021/0133466 | A1* | 5/2021 | Gier | G05D 1/0223 |
| 2021/0139048 | A1* | 5/2021 | Russell | B60W 50/0097 |
| 2021/0170943 | A1* | 6/2021 | Mimura | B60Q 1/549 |
| 2021/0171064 | A1* | 6/2021 | Mimura | B60Q 1/545 |
| 2021/0171065 | A1* | 6/2021 | Mimura | B60Q 1/545 |
| 2021/0183247 | A1* | 6/2021 | Pandit | H04W 4/40 |
| 2021/0261124 | A1* | 8/2021 | Niewiadomski | B60W 30/06 |
| 2021/0268957 | A1* | 9/2021 | Fujita | B60Q 1/42 |
| 2021/0269024 | A1* | 9/2021 | Fujita | H04W 4/46 |
| 2021/0300369 | A1* | 9/2021 | Yu | B60W 30/18109 |
| 2021/0387623 | A1* | 12/2021 | Yetukuri | B60W 30/18018 |
| 2021/0402998 | A1* | 12/2021 | Inoue | B60W 10/18 |
| 2022/0024451 | A1* | 1/2022 | Park | B60W 30/08 |
| 2022/0063627 | A1* | 3/2022 | Hashimoto | B60Q 1/346 |
| 2022/0063675 | A1* | 3/2022 | Mimura | B60Q 1/545 |
| 2022/0097691 | A1* | 3/2022 | Pyun | B60W 30/0956 |
| 2022/0113737 | A1* | 4/2022 | Kobayashi | G05D 1/0011 |
| 2022/0219599 | A1* | 7/2022 | Mochizuki | B60Q 1/507 |
| 2022/0227372 | A1* | 7/2022 | Nilsson | G05D 1/0212 |
| 2022/0234497 | A1* | 7/2022 | Nagasawa | B60Q 1/40 |
| 2022/0250535 | A1* | 8/2022 | Assaliyski | B60Q 1/507 |
| 2022/0274596 | A1* | 9/2022 | Srivatsan | B60W 10/20 |
| 2022/0291690 | A1* | 9/2022 | Goyal | B60W 60/001 |
| 2022/0315028 | A1* | 10/2022 | Kawano | G01C 21/3461 |
| 2022/0324480 | A1* | 10/2022 | Tsunekazu | B60W 60/001 |
| 2022/0340076 | A1* | 10/2022 | Lim | H04W 4/46 |
| 2022/0348227 | A1* | 11/2022 | Foster | B60Q 1/507 |
| 2022/0390251 | A1* | 12/2022 | Suzuki | B60Q 1/34 |
| 2023/0001845 | A1* | 1/2023 | Takagi | B60Q 1/346 |
| 2023/0037006 | A1* | 2/2023 | Quint | B60W 40/09 |
| 2023/0041448 | A1* | 2/2023 | Fiedler | B60Q 1/507 |
| 2023/0077863 | A1* | 3/2023 | Pendleton | G06F 11/3692 |
| | | | | 701/27 |
| 2023/0078779 | A1* | 3/2023 | Eng | B60W 30/18159 |
| | | | | 701/117 |
| 2023/0081111 | A1* | 3/2023 | Eng | B60W 50/035 |
| | | | | 701/25 |
| 2023/0091987 | A1* | 3/2023 | Pendleton | B60W 50/0097 |
| | | | | 701/26 |
| 2023/0093601 | A1* | 3/2023 | Pendleton | G06V 20/58 |
| | | | | 701/23 |
| 2023/0127230 | A1* | 4/2023 | Molnar | B60W 40/12 |
| | | | | 701/23 |
| 2023/0132029 | A1* | 4/2023 | Gao | G05D 1/0011 |
| | | | | 701/24 |
| 2023/0162508 | A1* | 5/2023 | Xia | B60W 60/00274 |
| | | | | 382/104 |
| 2023/0234612 | A1* | 7/2023 | Naserian | B60W 60/00 |
| | | | | 701/24 |
| 2023/0242139 | A1* | 8/2023 | Siutkowski | B60Q 1/507 |
| | | | | 701/23 |
| 2024/0246535 | A1* | 7/2024 | Chiba | B60W 30/18163 |
| 2024/0246577 | A1* | 7/2024 | Hashimoto | B60W 50/14 |

OTHER PUBLICATIONS

International Search Report and Written Opinion in International Appln. No. PCT/US2023/034967, mailed on Jan. 4, 2024, 16 pages.

* cited by examiner

TURN SIGNAL ASSIGNMENT FOR COMPLEX MANEUVERS

CROSS-REFERENCE TO RELATED APPLICATIONS

The present application claims priority to U.S. Provisional Application No. 63/417,962, filed Oct. 20, 2022, and entitled "Turn Signal Assignment for Complex Maneuvers," the entirety of which is incorporated by reference herein.

BACKGROUND

A turn signal of a vehicle, such as an autonomous vehicle, may be activated to indicate a direction of the vehicle to comply with turn signal requirements included in road regulations. However, it can be difficult to quickly and efficiently determine whether a turn signal of the vehicle should be activated, when the turn signal should be activated, and/or in what direction the turn signal should be activated. Consideration of such options can be computationally expensive, inefficient, and slow, particularly in a complex environment including complex maneuvers for the vehicle.

DETAILED DESCRIPTION

Figure 1:
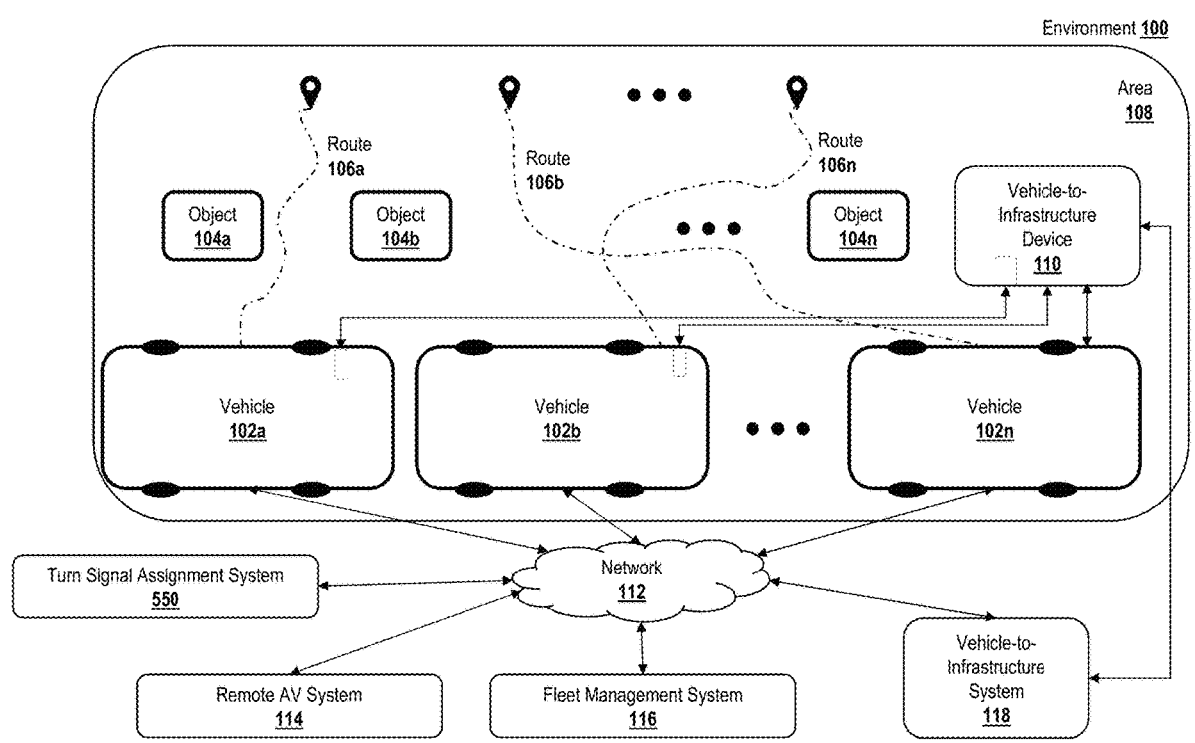
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement turn signal assignment for complex maneuvers. Generally, a turn signal of a vehicle (e.g., an autonomous vehicle) may be activated to indicate a direction of the vehicle. The control system associated with the vehicle uses a hierarchical structure to assign turn signals for complex maneuvers of vehicles. For example, the hierarchical structure may be applied based on positional information associated with the vehicle to determine whether a turn signal of the vehicle should be activated, when the turn signal should be activated, and/or in what direction the turn signal should be activated. The hierarchical structure may include a priority order of determinations made based on the positional information to account for each of the complex maneuvers.

By virtue of the implementation of systems, methods, and computer program products described herein, techniques for turn signal assignment for complex maneuvers. Road regulations generally include requirements for the turn signals. However, the regulations often do not account for sequentially close intersections, or combinations of concurrent actions, such as a lane change or circumvention of an obstacle in the lane, traversal of an intersection, and/or an approach of a parking or pick up-drop off zone. it can also be difficult for vehicles, such as autonomous vehicles, to quickly and efficiently determine whether a turn signal of the vehicle should be activated, when the turn signal should be activated, and/or in what direction the turn signal should be activated. Consideration of such options can be computationally expensive, inefficient, and slow, particularly in a complex environment including complex maneuvers. Some advantages of the described techniques include using the hierarchical structure to assign turn signals for complex maneuvers of vehicles, including the above-mentioned maneuvers. Applying the hierarchical structure in the priority order helps to efficiently, quickly, and accurately address each of the complex maneuvers.

Some advantages of the described techniques further include a significant reduction in computational requirements compared to conventional systems. In some examples, by virtue of the implementation of systems and methods described herein, the computational resources consumed by an autonomous system of an autonomous vehicle for assigning turn signals during operation of the autonomous vehicle through an environment are reduced. This allows for reallocation of the otherwise used computing resources on other tasks performed by the autonomous system.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118, and turn signal assignment system 550. Vehicles 102a-102n, vehicle-to-infrastructure (V2I) device 110, network 112, autonomous vehicle (AV) system 114, fleet management system 116, V2I system 118, and turn signal assignment system 550 (described in more detail with respect to FIGS. 5-12) interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, V2I system 118, and turn signal assignment system 550 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, V2I system 118, and/or turn signal assignment system 550 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
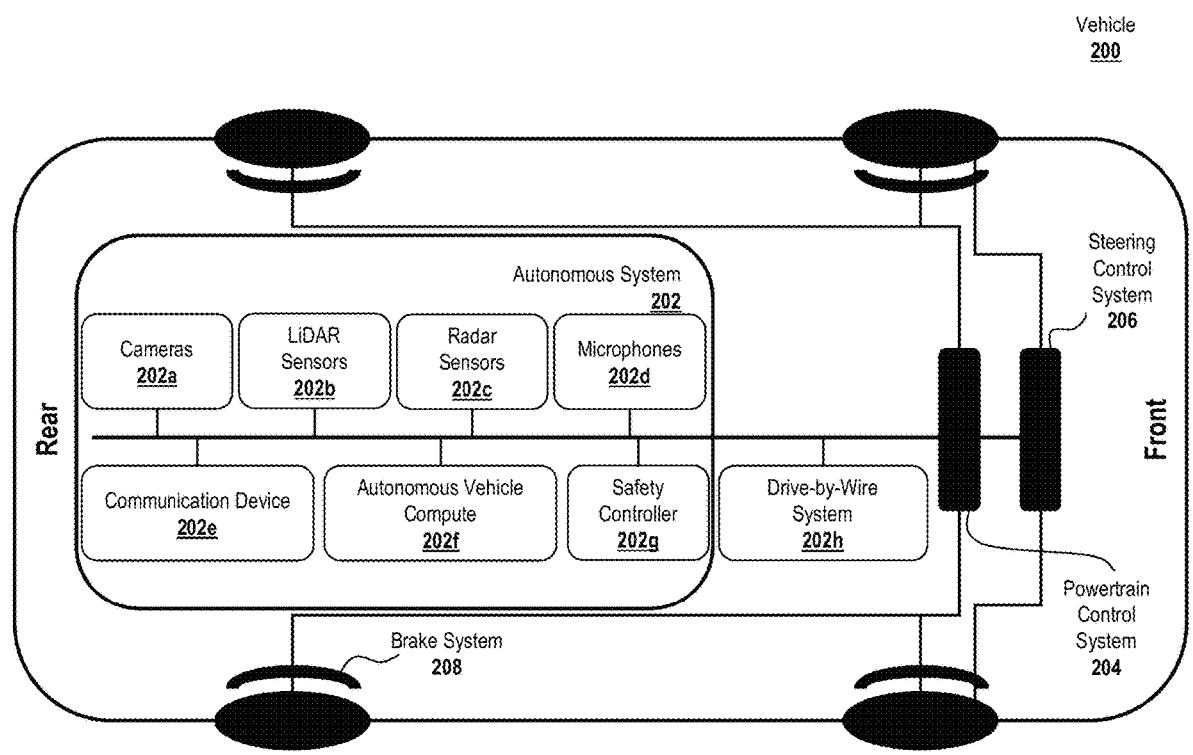
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
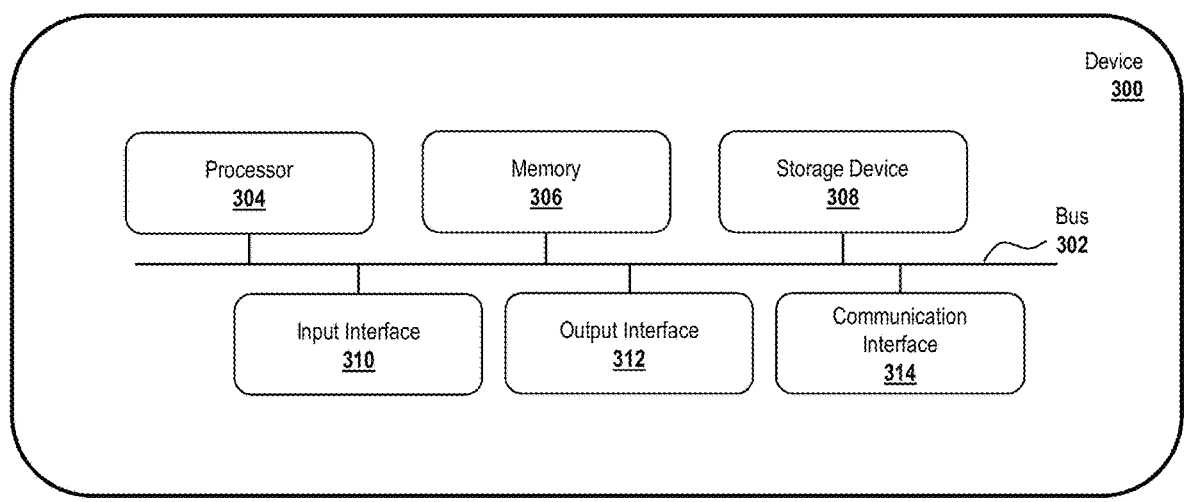
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of turn signal assignment system 550 (e.g., at least one device of a system of the turn signal assignment system 550), and/or one or more devices of network 112 (e.g., one or more devices of a system of network 112). In some embodiments, one or more devices of vehicles 102 (e.g., one or more devices of a system of vehicles 102), at least one device of turn signal assignment system 550 (e.g., at least one device of a system of the turn signal assignment system 550), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
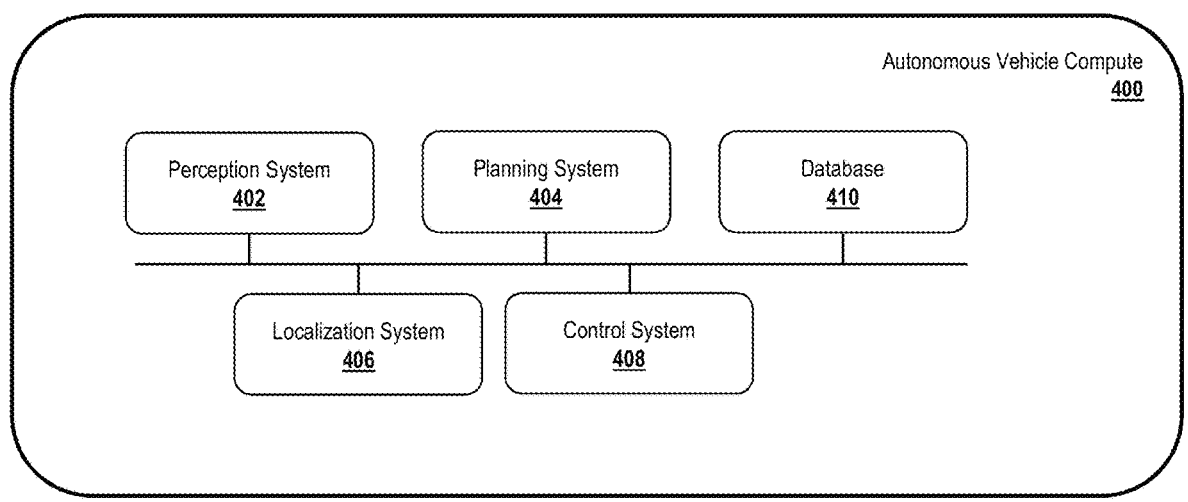
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
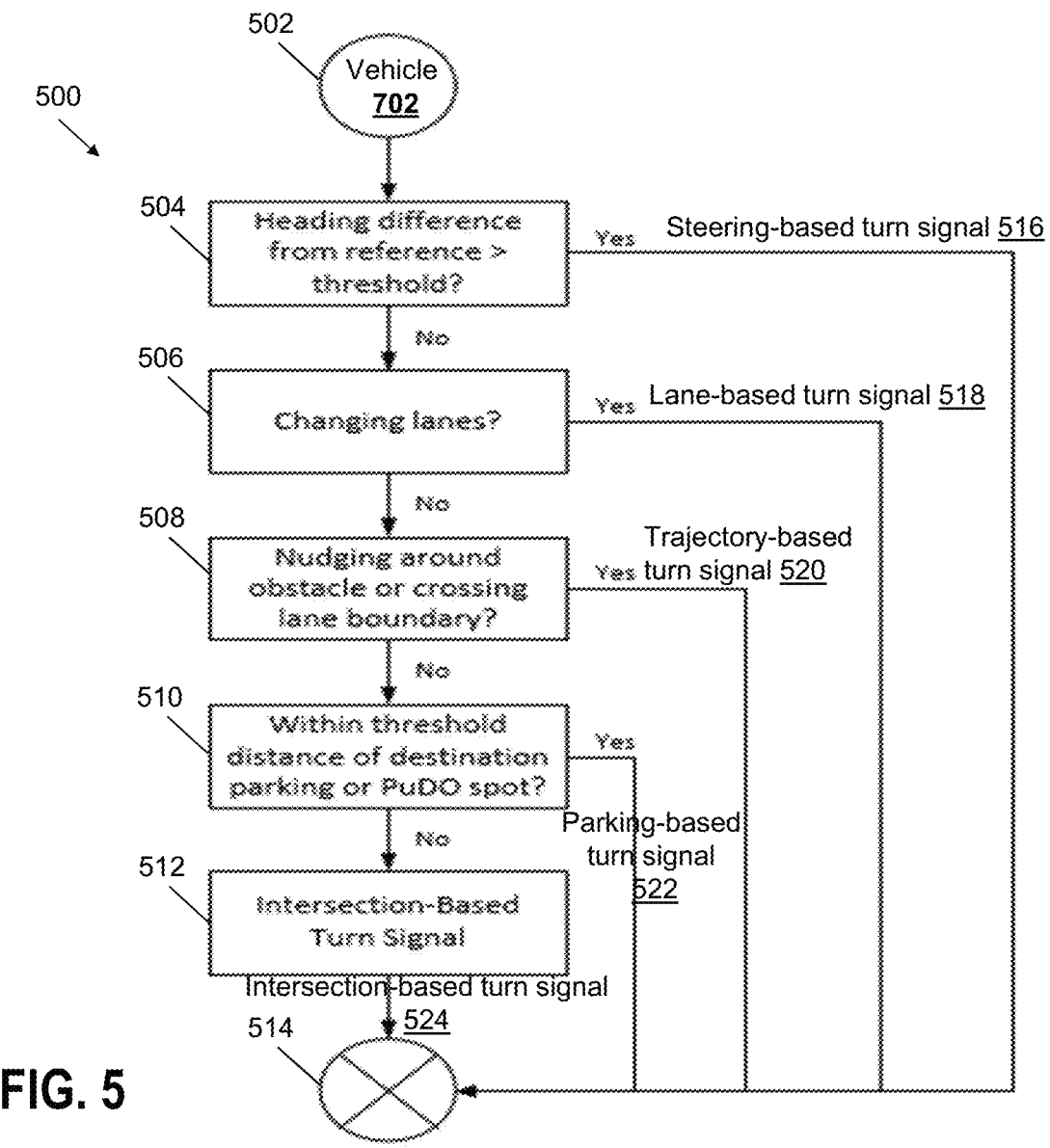
FIG. 5 is a flowchart of an example process for turn signal assignment for complex maneuvers.

Referring now to FIG. 5, illustrated is a flowchart of a process 500 for turn signal assignment for complex maneuvers. As described herein, a turn signal includes a signal or other indicator (e.g., a light, a sound, and/or the like), emitted by a vehicle to indicate a direction of travel and/or a change in direction of travel of the vehicle. In some embodiments, one or more of the steps described with respect to the process 500 are performed (e.g., completely, partially, and/or the like) by turn signal assignment system 550 (see FIG. 1).

For example, turn signal assignment system 550 may perform one or more steps of the process 500 to determine whether to activate the turn signal, determine when to activate the turn signal, and/or to activate the turn signal. In an embodiment, turn signal assignment system 550 is included in autonomous vehicle compute 400, one or more other systems described with respect to environment 10, and/or the like. Turn signal assignment system 550 can be implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware.

Additionally or alternatively, in some embodiments, one or more steps described with respect to process 500 and 1200 (see FIG. 12) are performed (e.g., completely, partially, and/or the like) by another device or group of devices separate from or including turn signal assignment system 550, such as vehicles 102a-102n and/or vehicles 200 (e.g., the one or more controllers of DBW system 202h), vehicle-to-infrastructure (V2I) device 110, network 112, remote autonomous vehicle (AV) system 114, fleet management system 116, V2I system 118, planning system 404, and/or control system 408. In some embodiments, turn signal assignment system 550 includes, forms a part of, is coupled to, and/or uses vehicles 102a-102n and/or vehicles 200, objects 104a-104n, routes 106a-106n, area 108, vehicle-to-infrastructure (V2I) device 110, network 112, remote autonomous vehicle (AV) system 114, fleet management system 116, V2I system 118, planning system 404, and/or control system 408. In some embodiments, turn signal assignment system 550 is the same as or similar to vehicles 102a-102n and/or vehicles 200, objects 104a-104n, routes 106a-106n, area 108, vehicle-to-infrastructure (V2I) device 110, network 112, remote autonomous vehicle (AV) system 114, fleet management system 116, V2I system 118, planning system 404, and/or control system 408.

In an embodiment, the turn signal assignment system 550 transmits a control signal to activate a turn signal of a particular vehicle as the vehicle operates along a trajectory. While a vehicle 702 is referenced with respect to FIGS. 5-12, vehicle 702 can also include vehicles 102a-102n, vehicle 200, other vehicles described herein, and/or positions thereof.

Turn signal assignment system 550 can determine whether to activate a turn signal of vehicle 702 based at least on position information associated with a position of the vehicle. For example, turn signal assignment system 550 can determine whether to change a state of the turn signal from on to off or off to on, and/or a direction of the turn signal based at least on position information.

Position information can include a heading direction of vehicle 702, a trajectory (e.g., a lateral trajectory) of vehicle 702, a descriptor associated with the trajectory, and/or the like. The heading direction includes a direction vehicle 702 is pointing or the direction of the steering angle of vehicle 702. The lateral trajectory includes an upcoming trajectory, path, a side-to-side projected path, and/or the like. The descriptor includes a homotopy word or a high level descriptor of the trajectory of the vehicle, such as "Homotopy:: allow_lane_change=true" or "Homotopy:: allow_lane_change=false".

Turn signal assignment system 550 can use position information to determine a current direction of travel of vehicle 702 and/or a future direction of travel of vehicle 702. Referring to FIG. 5, at 502, vehicle 702 can receive position information from one or more systems or devices, such as autonomous vehicle compute 400, device 300, autonomous system 202, or the like.

Turn signal assignment system 550 can hierarchically determine whether to activate the turn signal. The hierarchical determination can include a plurality of ordered determinations or steps turn signal assignment system 550 performs to determine whether to activate the turn signal, when to activate the turn signal, and/or the like. In an embodiment, turn signal assignment system 550 performs each determination in the plurality of ordered determinations in a predetermined order (e.g., sequential or priority order). Turn signal assignment system 550 may activate the turn signal of vehicle 702 based on a positive determination in any of the ordered determinations. Activation of the turn signal of vehicle 702 at any of the ordered determinations ends the hierarchical determination, at 514, such that turn signal assignment system 550 does not proceed to any of the remaining determinations in the plurality of ordered determinations.

Based at least on a negative determination in any of the ordered determinations, turn signal assignment system 550 performs the next determination of the plurality of ordered determinations in the predetermined order. In an embodiment, the hierarchical determination includes, in priority order, a first determination whether to activate a steering-based turn signal 516, a second determination whether to activate a lane-based turn signal 518, a third determination whether to activate a trajectory-based turn signal 520, a fourth determination whether to activate a parking-based turn signal 522, and/or a fifth determination whether to activate an intersection-based turn signal 524.

Turn signal assignment system 550 can perform the hierarchical determination prior to activation of the turn signal based on a turn (e.g., a change in direction) of vehicle 702 at a roadway intersection, such as an intersection including two or more lanes. In other words, turn signal assignment system 550 performs each of the plurality of ordered determinations prior to determining whether vehicle 702 is turning (e.g., a left turn, a right turn, and/or the like) at the roadway intersection. Accordingly, in an embodiment, the last determination in the predetermined order of the plurality of ordered determinations includes determining whether vehicle 702 is turning at a roadway intersection and as a result, whether and/or when the turn signal should be activated if vehicle 702 is turning at the roadway intersection. Such embodiments allow for turn signal assignment system 550 to efficiently, quickly, and accurately apply a hierarchical structure (e.g., the hierarchical determination in the predetermined order of the plurality of ordered determinations) when assigning turn signals during complex maneuvers, irrespective of driving direction and/or local turn signal regulations.

Referring to FIG. 5, at 504, turn signal assignment system 550 performs a first determination of the plurality of ordered determinations in a priority order. The first determination includes determining whether to activate the turn signal of vehicle 702 and assign a steering-based turn signal 516.

Turn signal assignment system 550 determines a deviation (e.g., a heading difference) from a reference path to determine whether to assign the steering-based turn signal 516. In an embodiment, turn signal assignment system 550 determines an angle between the heading direction and a reference path, which includes a center of a lane on the roadway. In other words, turn signal assignment system 550 determines the heading difference (e.g., the angle) between the heading direction and the reference path. The reference path serves as a baseline path of vehicle 702.

Turn signal assignment system 550 compares the angle to a threshold angle. The threshold angle can be 90 degrees (e.g., indicating a left or right turn), 45 degrees to 75 degrees, 75 degrees to 100 degrees, 100 degrees to 125 degrees, other ranges therebetween, greater, or lesser. Comparing the angle to the threshold angle provides a deviation from the reference path. In an embodiment, this determination can be used for a k-turn, a u-turn, turning from a shoulder or driveway, or other turns in which there is a recovery from a roadway departure. For example, this determination can be used during high angle differential turns relative to the reference path.

If turn signal assignment system 550 determines the angle is greater than (or equal to) the threshold angle, turn signal assignment system 550 activates the steering-based turn signal 516 in a direction (e.g., left or right) of the steering angle. Thus, if turn signal assignment system 550 determines the angle is greater than (or equal to) the threshold angle, turn signal assignment system 550 does not continue to a next determination of the plurality of ordered determinations in the priority order.

In an embodiment, based at least on the determination that the angle is greater than the threshold angle, turn signal assignment system 550 determines the time to activate the steering-based turn signal 516. For example, turn signal assignment system 550 can determine the steering-based turn signal 516 should be activated upon determining the angle is greater than the threshold angle or a certain (e.g., predetermined or determined) time or distance after determining the angle is greater than the threshold angle. Based at least on the determination the steering-based turn signal 516 should be activated, turn signal assignment system 550 transmits a control signal to vehicle 702 to activate the steering-based turn signal 516 at the determined time. In an embodiment, turn signal assignment system 550 transmits another control signal to deactivate the steering-based turn signal 516 after detecting the maneuver has been completed.

If turn signal assignment system 550 determines the angle is less than (e.g., not greater than or equal to) the threshold angle, turn signal assignment system 550 performs a next (e.g., a second) determination of the plurality of ordered determinations in the priority order.

Again referring to FIG. 5, at 506, turn signal assignment system 550 performs a second determination of the plurality of ordered determinations in the priority order. The second determination includes determining whether to activate the turn signal of vehicle 702 and assign a lane-based turn signal 518. The second determination is made after the first determination.

As at least a part of the second determination, turn signal assignment system 550 determines whether vehicle 702 is experiencing a lane change (e.g., a change in a lane of a roadway in a left or right direction). This allows for turn signal assignment system 550 to properly activate the lane-based turn signal 518 when vehicle 702 is changing lanes and/or crossing a lane boundary. As noted, turn signal assignment system 550 determines whether vehicle 702 is experiencing a lane change after determining the angle between the heading direction and the reference path of vehicle 702 is less than the threshold angle.

Turn signal assignment system 550 determines whether vehicle 702 is experiencing a lane change based on a descriptor. As described herein, the descriptor includes a homotopy word or a high level descriptor of the trajectory of vehicle 702. In other words, the descriptor includes a high level descriptor of a solution subspace where all solutions in the solution subspace can be continuously deformed to obtain other solutions in the subspace. In an embodiment, the descriptor includes a description of a trajectory of vehicle 702 with respect to an obstacle, a description of a trajectory of vehicle 702 with respect to a lane change, and/or the like. Thus, in an embodiment, the descriptor indicates whether vehicle 702 is experiencing a lane change, circumventing an obstacle, and/or the like.

Figure 6:
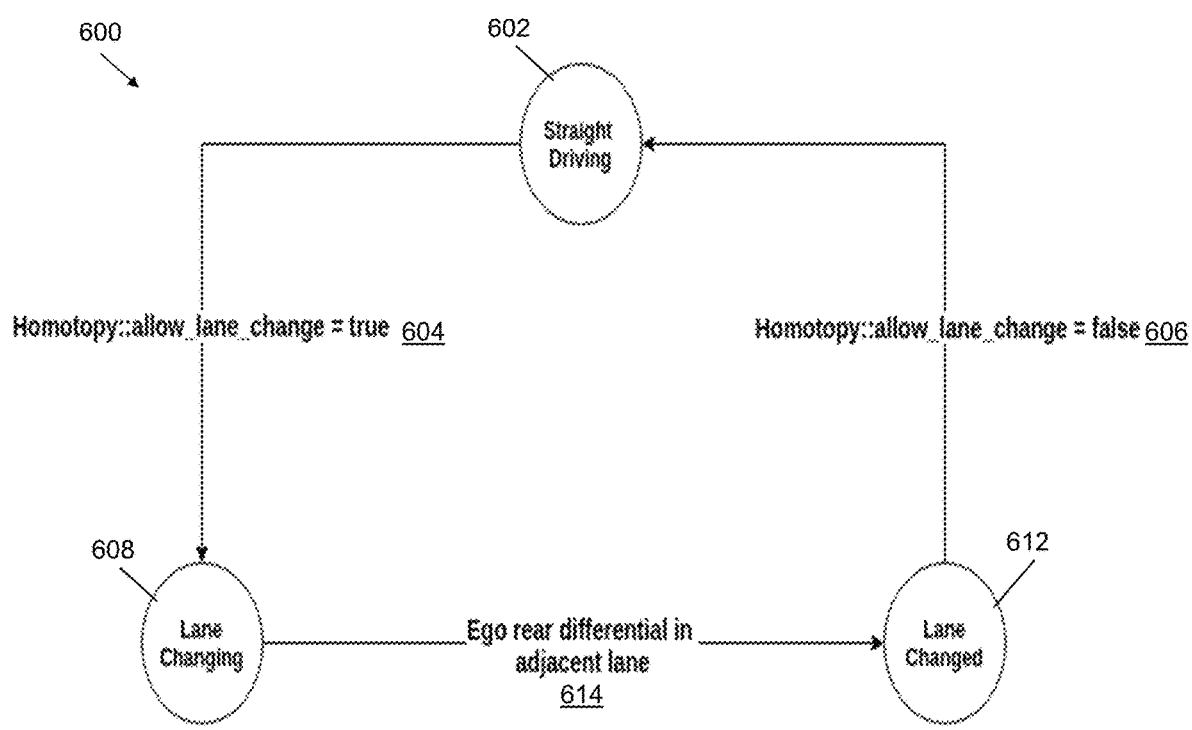
FIG. 6 is a diagram of an example process for turn signal assignment in changing lanes.

FIG. 6 is a diagram of an example process 600 for turn signal assignment in changing lanes. Turn signal assignment system 550 may use the process 600 to determine whether to assign the lane-based turn signal 518, at 506. In an embodiment, vehicle 702 is driving within a lane (e.g., driving straight) at 602. As shown in FIG. 6, a first descriptor 604 (e.g., "Homotopy::allow_lane_change=true") indicates vehicle 702 is experiencing a lane change.

Referring back to FIG. 5, if turn signal assignment system 550 determines vehicle 702 is changing lanes (e.g., from a current lane to a target lane) based on the descriptor (e.g., the first descriptor 604), turn signal assignment system 550 activates the lane-based turn signal 518 in a direction (e.g., left or right) of the lane change. Based at least on the determination the lane-based turn signal 518 should be activated, turn signal assignment system 550 transmits a control signal to vehicle 702 to activate the lane-based turn signal 518 at a determined time. In an embodiment, turn signal assignment system 550 transmits another control signal to deactivate the lane-based turn signal 518 after detecting the lane change maneuver has been completed. Thus, if turn signal assignment system 550 determines vehicle 702 is experiencing a lane change, turn signal assignment system 550 does not continue to a next determination of the plurality of ordered determinations in the priority order.

At 608, vehicle 702 changes lanes (e.g., crosses a lane boundary from a current lane to a target lane) based at least on the first descriptor 604. For example, the first descriptor 604 indicates a lane change is allowed. Thus, at 608, vehicle 702 changes lanes to the left or right based at least on the first descriptor 604.

At 614, turn signal assignment system 550 determines whether a rear differential of vehicle 702 is in an adjacent lane (e.g., the lane from which vehicle 702 changed lanes) or if the rear differential has entered the target lane. In an embodiment, turn signal assignment system 550 determines the rear differential of the vehicle 702 has moved from the adjacent lane to the target lane in which the vehicle 702 is positioned. Based at least on such determination, at 612, turn signal assignment system 550 determines vehicle 702 has changed lanes (e.g., crossed lane boundaries).

In an embodiment, turn signal assignment system 550 deactivates the lane-based turn signal 518 based at least on a second descriptor 606 and/or the determination vehicle 702 has changed lanes. The second descriptor 606 (e.g., "Homotopy::allow_lane_change=false") indicates vehicle 702 is no longer experiencing a lane change or is otherwise not currently experiencing a lane change. Based at least on the second descriptor 606, turn signal assignment system 550 terminates the lane-based turn signal 518, and vehicle 702 returns to operating within a current lane at 602.

Referring back to FIG. 5, if turn signal assignment system 550 determines vehicle 702 is not experiencing a lane change and determines to not activate the lane-based turn signal 518, turn signal assignment system 550 performs a next (e.g., a third) determination of the plurality of ordered determinations in the priority order.

Again referring to FIG. 5, at 508, turn signal assignment system 550 performs a third determination of the plurality of ordered determinations in the priority order. The third determination includes determining whether to activate the turn signal of vehicle 702 and assign a trajectory-based turn signal 520. The third determination is made after the second determination and the first determination.

As at least a part of the third determination, turn signal assignment system 550 determines whether to activate the trajectory-based turn signal 520 after determining whether to activate lane-based turn signal 518. For example, turn signal assignment system 550 determines whether vehicle 702 is performing a maneuver within a lane, without crossing a lane boundary and/or to circumvent an obstacle that causes a deviation in a trajectory of vehicle 702 compared to a reference path of vehicle 702. In an embodiment, turn signal assignment system 550 determines, as part of the third determination, whether vehicle 702 is nudging around an obstacle, such as an object within a current lane of vehicle 702, or whether vehicle 702 is crossing a lane boundary of the current lane of vehicle 702. For example, vehicle 702 can circumvent an obstacle by nudging, rather than by changing lanes (e.g., crossing lane boundaries). In another embodiment, vehicle 702 can circumvent the obstacle by crossing a lane boundary and re-crossing the lane boundary to reenter the original lane to travel along the reference path after passing an inflection point at the obstacle. Such examples can be different from the lane-based turn signal 518 determination (e.g., the second determination), since vehicle 702 is circumventing an obstacle, causing vehicle 702 to temporarily and laterally deviate from the reference path, rather than crossing a lane boundary to reach and/or remain in a target lane.

Figure 7:
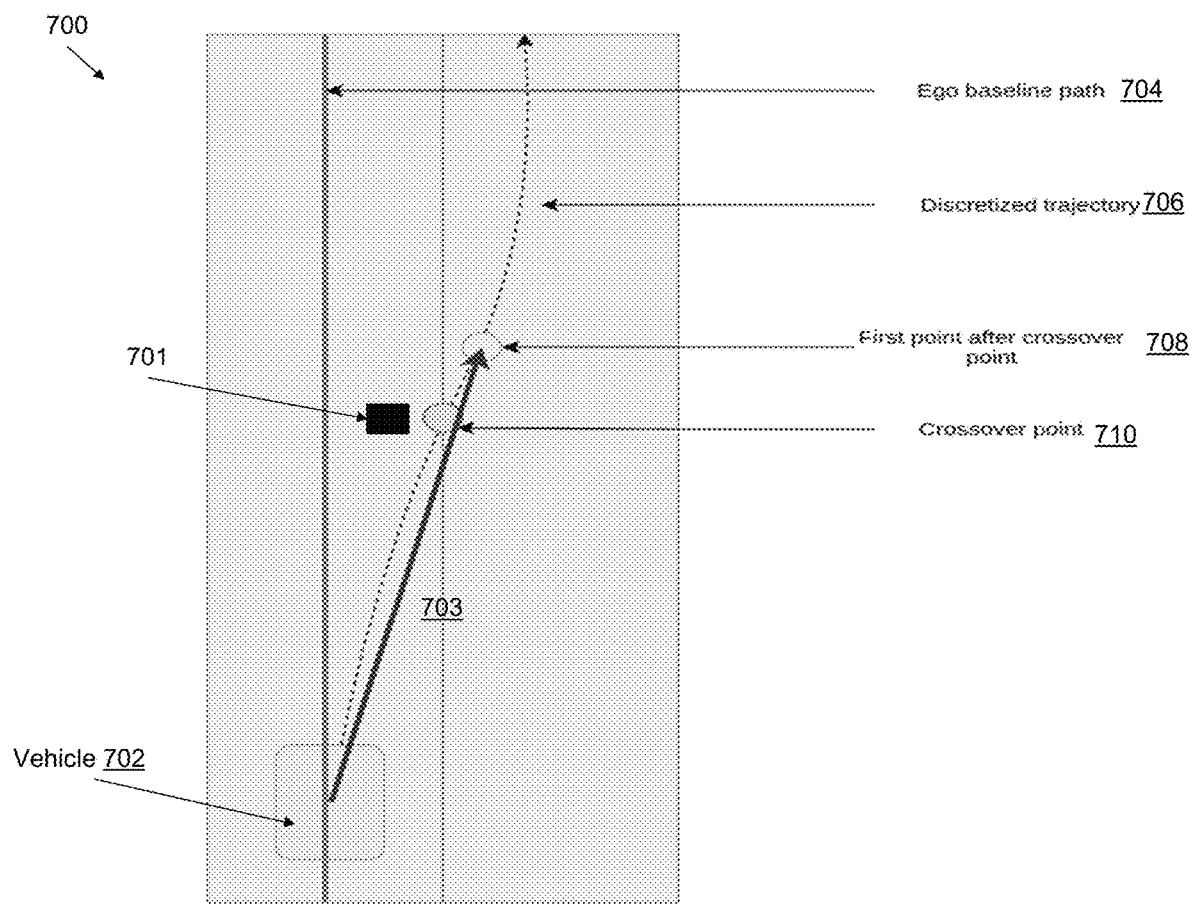
FIG. 7 is a diagram of an example vehicle circumventing an obstacle.

FIG. 7 is a diagram 700 of an example vehicle 702 circumventing an obstacle 701. Referring to FIG. 7, vehicle 702 travels along a reference path (e.g., ego baseline path) 704. As described herein, the reference path 704 can be a center of a lane on the roadway in which vehicle 702 is traveling. Reference path 704 serves as a baseline path of vehicle 702.

As shown in FIG. 7, vehicle 702 deviates from reference path 704 to circumvent obstacle 701. In this example, vehicle 702 nudges around obstacle 701 to the right of obstacle 701, and passes obstacle 701 at crossover point 710, where vehicle 702 temporarily crosses a lane boundary 703. As vehicle 702 reaches the crossover point 710, vehicle 702 laterally deviates from reference path 704. Further, as vehicle 702 continues around obstacle 701 at a first point 708 after crossover point 710 and, and along discretized trajectory 706, vehicle 702 turns back towards reference path 704. However, as vehicle 702 circumvents obstacle 701, vehicle 702 travels along a lateral trajectory (e.g., discretized trajectory 706) that deviates from reference path 704 by a distance that is greater than or equal to a threshold deviation (e.g., distance). The threshold deviation may be 1 to 2 m, 2 to 3 m, 3 to 4 m, and/or the like.

In this example, turn signal assignment system 550 determines a deviation (e.g., a distance) between the lateral trajectory of vehicle 702 and reference path 704. Here, turn signal assignment system 550 determines the lateral trajectory meets or exceeds the threshold deviation, such as when vehicle 702 reaches crossover point 710. As a result, turn signal assignment system 550 activates trajectory-based turn signal 520 based on a direction of the lateral trajectory. Based at least on the determination trajectory-based turn signal 520 should be activated, turn signal assignment system 550 transmits a control signal to vehicle 702 to activate trajectory-based turn signal 520 at a determined time. In an embodiment, turn signal assignment system 550 transmits another control signal to deactivate trajectory-based turn signal 520 after detecting the circumvention maneuver has been completed.

When turn signal assignment system 550 determines the lateral trajectory returns to within the threshold deviation from reference path 704, turn signal assignment system 550 deactivates trajectory-based turn signal 520. In other words, if turn signal assignment system 550 determines the deviation meets the threshold deviation, and then detects a subsequent deviation in the opposite direction that causes vehicle 702 to return to a lateral trajectory that deviates from reference path 704 by less than the threshold deviation, turn signal assignment system 550 deactivates trajectory-based turn signal 520.

Thus, turn signal assignment system 550 terminates trajectory-based turn signal 520 once the lateral trajectory of vehicle 702 returns close to reference path 704. This helps to signal intention for maneuvers within wide lanes, when circumventing obstacles within a lane, when circumventing obstacles that cause the vehicle to cross a lane boundary and return to the original lane, when circumventing an obstacle without lane boundaries, and/or the like. Accordingly, if turn signal assignment system 550 determines the deviation meets the threshold deviation, turn signal assignment system 550 does not continue to a next determination of the plurality of ordered determinations in the priority order.

If turn signal assignment system 550 determines the deviation between reference path 704 and the lateral trajectory of vehicle 702 is less than the threshold deviation, turn signal assignment system 550 determines to not activate the trajectory-based turn signal 520. Thus, if turn signal assignment system 550 determines the deviation fails to meet the threshold deviation, turn signal assignment system 550 performs a next (e.g., a fourth) determination of the plurality of ordered determinations in the priority order.

Again referring to FIG. 5, at 510, turn signal assignment system 550 performs a fourth determination of the plurality of ordered determinations in the priority order. The fourth determination includes determining whether to activate the turn signal of vehicle 702 and assign a parking-based turn signal 522. The fourth determination is made after the third determination, the second determination, and the first determination.

As at least a part of the fourth determination, turn signal assignment system 550 determines whether vehicle 702 is within a threshold distance of a destination parking spot and/or a pick up drop off ("PuDo") zone. Based on the determination, turn signal assignment system 550 can activate a parking-based turn signal 522. In other words, turn signal assignment system 550 can initialize the parking-based turn signal 522 when vehicle 702 is within a threshold distance of the destination parking spot or PuDo zone.

As an example, turn signal assignment system 550 determines a distance from a destination parking spot and/or a PuDo zone. The destination parking spot includes a predetermined parking spot, a parking lot, and/or the like at a destination of vehicle 702. The PuDo zone includes a predetermined pick up-drop off zone at the destination of vehicle 702. Turn signal assignment system 550 can compare the determined distance to a threshold distance (e.g., 1 to 2 m, 2 to 3 m, 3 to 4 m, 4 to 5 m, or the like).

If turn signal assignment system 550 determines the distance from the destination parking spot and/or the PuDo zone is less than the threshold distance, turn signal assignment system 550 activates the parking-based turn signal 522 in a direction (e.g., left or right) based on a relative position of vehicle 702 compared to a position of the destination parking spot and/or PuDo zone. For example, turn signal assignment system 550 activates the parking-based turn signal 522 in a direction (e.g., left or right) based on whether vehicle 702 is backing into a destination parking spot on the right or left, driving into the destination parking spot on the right or left, and/or the like.

Additionally, and/or alternatively, turn signal assignment system 550 activates the parking-based turn signal 522 in a direction based on a lane index and/or a locality driving direction. For example, in-lane PuDo zones may include biasing of vehicle 702 to one side (e.g., a left side or a right side) of the lane of travel. In this example, vehicle 702 may stop in the PuDo zone near a curb, but without entering any parking spot, such as the destination parking spot. In this example, turn signal assignment system 550 uses a lane index and/or local driving directions to determine a direction of the parking-based turn signal 522.

During parking, turn signal assignment system 550 determines which side of the lane vehicle 702 is biasing towards or is otherwise remaining along a baseline trajectory. In some examples, a default position is to bias center. In such examples, turn signal assignment system 550 determines to not activate the turn signal. During parking, vehicle 702 biases to one side (e.g., a left side or right side) of a lane. Turn signal assignment system 550 determines whether vehicle 702 is traveling within a right-most lane and/or a left-most lane. Alternatively, turn signal assignment system 550 determines vehicle 702 is traveling within a single lane roadway based on the lane being determined as both the right-most lane and the left-most lane. Turn signal assignment system 550 determines to bias towards the right when turn signal assignment system 550 determines vehicle 702 is traveling within the right-most lane, and activates parking-based turn signal 522 in the right direction. Additionally and/or alternatively, turn signal assignment system 550 determines to bias towards the left when turn signal assignment system 550 determines vehicle 702 is traveling within the left-most lane, and activates parking-based turn signal 522 in the left direction.

If turn signal assignment system 550 determines vehicle 702 is traveling within a single lane roadway, turn signal assignment system 550 determines a driving direction of the locality in which vehicle 702 is operating. For example, turn signal assignment system 550 activates parking-based turn signal 522 in the right direction (e.g., biases to the right) if and/or when turn signal assignment system 550 determines the locality driving direction is on the right side of the roadway. Alternatively, turn signal assignment system 550 activates parking-based turn signal 522 in the left direction (e.g., biases to the left) if and/or when turn signal assignment system 550 determines the locality driving direction is on the left side of the roadway.

Accordingly, if turn signal assignment system 550 determines to activate parking-based turn signal 522, turn signal assignment system 550 does not continue to a next determination (e.g., a fifth determination) of the plurality of ordered determinations in the priority order. In some examples, upon stopping at the destination parking spot and/or the PuDo zone, turn signal assignment system 550 terminates (e.g., deactivates) the parking-based turn signal 522 and activates hazard lights of vehicle 702. Based at least on the determination the parking-based turn signal 522 should be activated, turn signal assignment system 550 transmits a control signal to vehicle 702 to activate the parking-based turn signal 522 at the determined time. In an embodiment, turn signal assignment system 550 transmits another control signal to deactivate the parking-based turn signal 522 after detecting the parking maneuver has been completed.

If turn signal assignment system 550 determines the distance from the destination parking spot and/or the PuDo zone meets (e.g., is greater than or equal to) the threshold distance, turn signal assignment system 550 determines to not activate the parking-based turn signal 522. Turn signal assignment system 550 performs a next (e.g., a fifth) determination of the plurality of ordered determinations in the priority order.

Again referring to FIG. 5, at 512, turn signal assignment system 550 performs a fifth determination of the plurality of ordered determinations in the priority order. The fifth determination includes determining whether to activate the turn signal of vehicle 702 and assign an intersection-based turn signal 524. In some embodiments, the fifth determination is the final determination in the plurality of ordered determinations of the hierarchical determination. The fifth determination is made after the fourth determination, the third determination, the second determination, and the first determination.

As at least a part of the fifth determination, turn signal assignment system 550 determines whether to activate an intersection-based turn signal 524. In an embodiment, if the turn signal assignment system 550 reaches the fifth determination with respect to whether to activate the intersection-based turn signal 524, turn signal assignment system 550 has determined to not activate steering-based turn signal 516, lane-based turn signal 518, trajectory-based turn signal 520, and parking-based turn signal 522. As a result, turn signal assignment system 550 has determined vehicle 702 is not undergoing a complex maneuver, and may instead be turning at an intersection in the roadway.

In some embodiments, after turn signal assignment system 550 determines vehicle 702 is turning at an intersection, turn signal assignment system 550 determines a time to activate intersection-based turn signal 524. Generally, turn signal assignment system 550 activates intersection-based turn signal 524 when vehicle 702 is within (e.g., less than or equal to) an approach threshold distance from the upcoming intersection at which vehicle 702 is planning to turn. Turn signal assignment system 550 activates intersection-based turn signal 524 in the direction of the turn at the intersection. Activating intersection-based turn signal 524 when vehicle 702 reaches the approach threshold distance (e.g., at a signaling interval) from the upcoming intersection provides notice to other vehicles 702 of the upcoming turn and/or complies with local turn signal regulations.

However, in some examples, due to the approach distance threshold, the signaling interval may overlap with other roadway intersections that appear before vehicle 702 reaches the intersection at which vehicle 702 is planning to turn. To accommodate such situations, turn signal assignment system 550 may identify the intervening roadway intersection, and determine whether the direction of intersection-based turn signal 524 could match a turning direction option at the intervening roadway intersection. Turn signal assignment system 550 can delay activation of intersection-based turn signal 524 until vehicle 702 exists the intervening roadway intersection and no other intervening roadway intersections are detected within the signaling interval and prior to the roadway intersection at which vehicle 702 is planning to turn.

Figure 8:
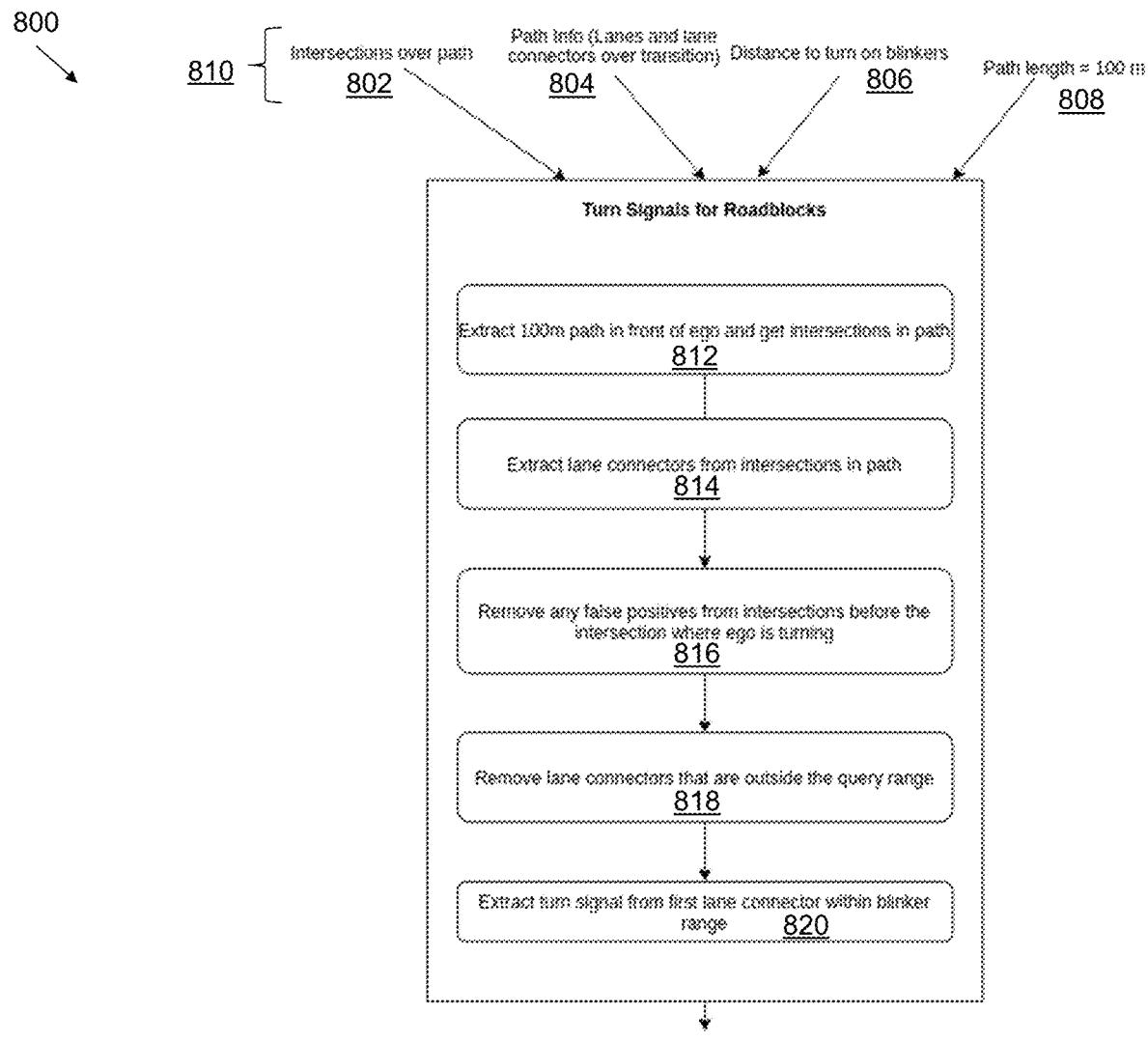
FIG. 8 is a flowchart of an example process for turn signal assignment in an intersection.
Figure 10:
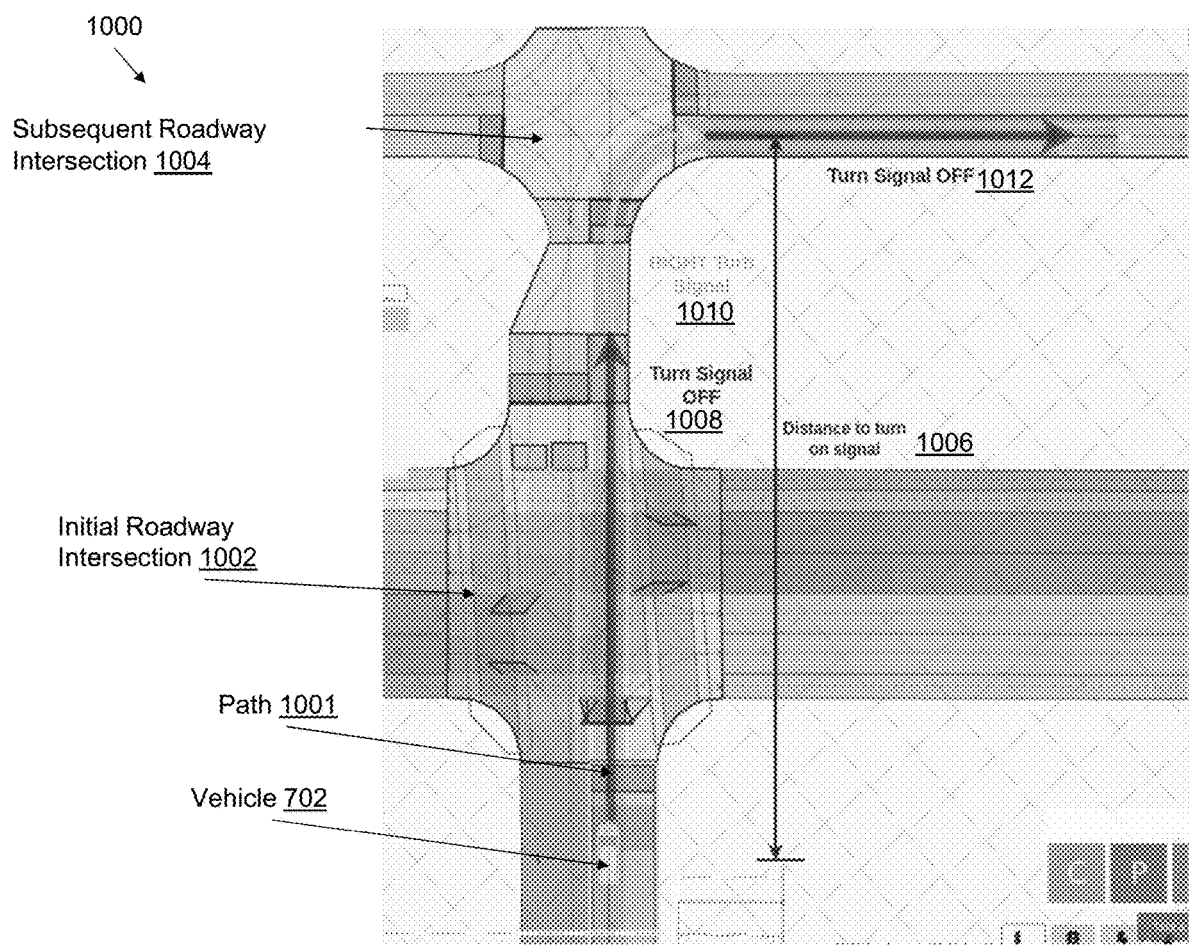
FIG. 10 is an example trajectory for a vehicle.

As an example, and with reference to FIG. 10, which depicts an example trajectory 1000 for vehicle 702, turn signal assignment system 550 extracts an upcoming path 1001 of vehicle 702 based at least on the position information and/or other input information 810 (see FIG. 8). Upcoming path 1001 can include a trajectory of vehicle 702 that includes a roadway intersection (e.g., subsequent intersection 1004) at which vehicle 702 is planning to turn and an initial (e.g., intervening) roadway intersection 1002 prior to subsequent roadway intersection 1004 at which vehicle 702 is planning to turn. Turn signal assignment system 550 detects subsequent roadway intersection 1004 is after initial roadway intersection 1002 along upcoming path 1001. Turn signal assignment system 550 additionally and/or alternatively detects a distance 1006, prior to the turn at subsequent roadway intersection 1004, to activate (e.g., turn on) intersection-based turn signal 524. Distance 1006 refers to the signaling interval. In this example, intersection-based turn signal 524 includes right turn signal 1010.

Referring to FIG. 10, since turn signal assignment system 550 detects initial roadway intersection 1002 is within distance 1006 (e.g., the signaling interval), and/or initial roadway intersection 1002 has an option to turn right, turn signal assignment system 550 delays the time to activate intersection-based turn signal 524 (e.g., the right turn signal 1010) until after vehicle 702 exits initial roadway intersection 1002. As shown in FIG. 10, turn signal assignment system 550 determines to maintain intersection-based turn signal 524 as off, at 1008, until after vehicle 702 exits initial roadway intersection 1002.

After turn signal assignment system 550 determines vehicle 702 has exited initial roadway intersection 1002, turn signal assignment system 550 activates the right turn signal 1010 (e.g., intersection-based turn signal 524), within the signaling interval, and prior to turning at subsequent roadway intersection 1004. Based at least on the determination that intersection-based turn signal 524 should be activated, turn signal assignment system 550 transmits a control signal to vehicle 702 to activate the intersection-based turn signal 524 at the determined time. In an embodiment, turn signal assignment system 550 transmits another control signal to deactivate intersection-based turn signal 524 after detecting the turn at subsequent roadway intersection 1004 maneuver has been completed. For example, referring to FIG. 10, at 1012, turn signal assignment system 550 turns off right turn signal 1010.

Figure 9:
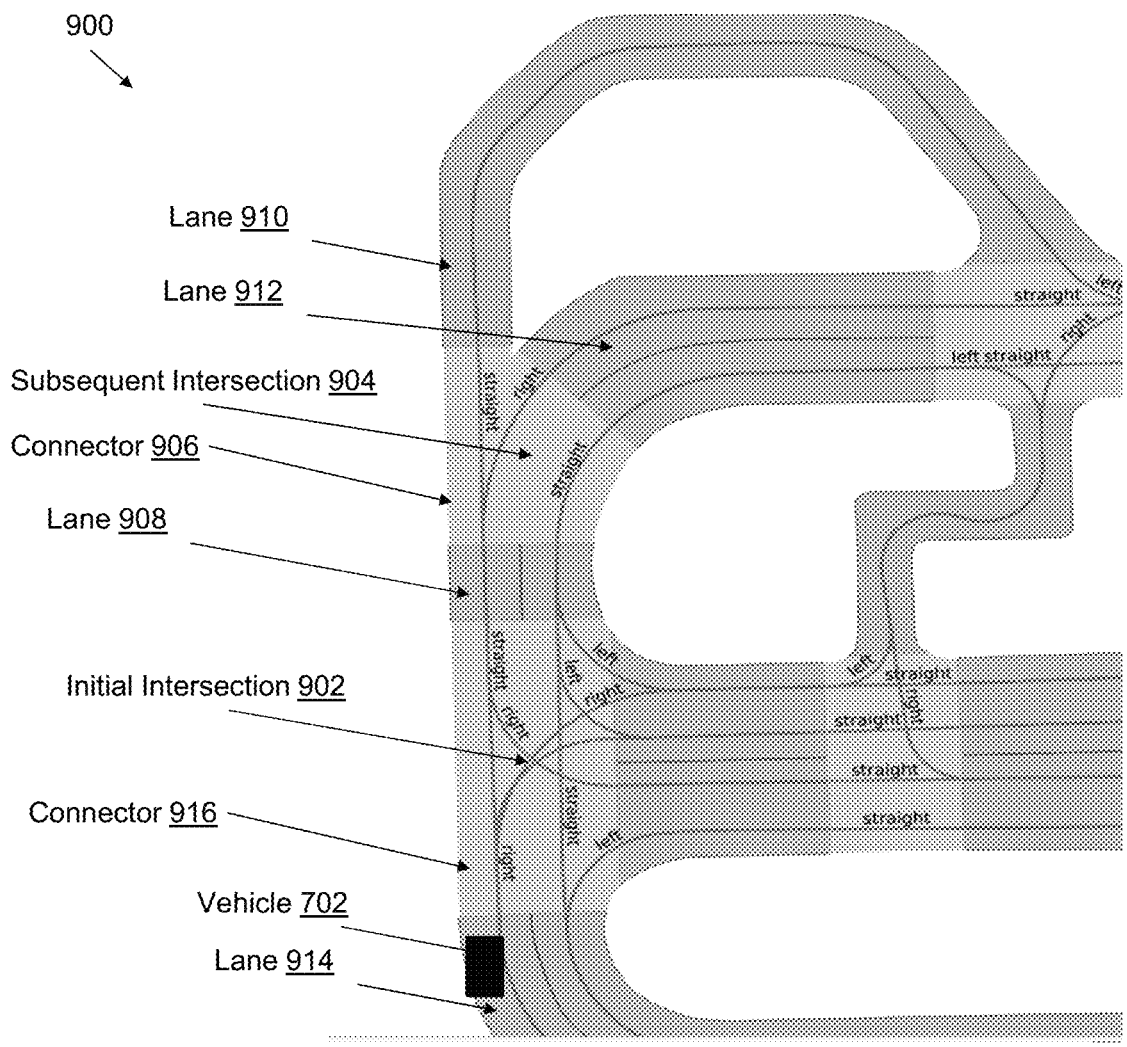
FIG. 9 is an example trajectory for a vehicle.

FIGS. 8 and 9 illustrate another example of the determination by turn signal assignment system 550 of a time to activate intersection-based turn signal 524. In particular, FIG. 8 is a flowchart of an example process 800 for turn signal assignment in an intersection and FIG. 9 is an example trajectory 900 for a vehicle, such as vehicle 702.

Referring to FIG. 9, trajectory 900 shows vehicle 702 traveling within lane 914, through initial intersection 902, within lane 908, and through subsequent intersection 904. In this example, vehicle 702 is planning to remain straight or turn at subsequent intersection 904. Also, initial intersection 902 is positioned within a signaling interval prior to subsequent intersection 904. Initial intersection 902 includes both options of remaining straight and turning right. Trajectory 900 also includes connector 916 connecting lane 914 and lane 908 through initial intersection 902. Trajectory 900 further includes connector 906 connecting lane 908 with either lane 912 or lane 910 through subsequent intersection 904. As shown in FIG. 9, lane 910 and lane 912 are two options following subsequent intersection 904. In particular, lane 910 continues straight from lane 908 through subsequent intersection 904 and lane 912 includes a right turn following subsequent intersection 904.

Referring to FIG. 8, turn signal assignment system 550 determines a time to activate intersection-based turn signal 524 based at least on input information 810 including intersections over path 802 (e.g., initial intersection 902 and subsequent intersection 904 shown in FIG. 9), path information (e.g., lane 908, lane 914, lane 910, lane 912, connector 916, and connector 906) 804, distance to turn on blinkers 806 (e.g., signaling distance), path length (e.g., a length of the path along which vehicle 702 is traveling to subsequent intersection 904) 808, and/or the like. In this example, path length 808 is 100 m, although other path lengths are contemplated.

At 812, turn signal assignment system 550 extracts the path length 808 in front of vehicle 702 (e.g., ego) and detects the intersections over path 802 within the path length 808. For example, turn signal assignment system 550 detects, based at least on the input information 810, identifies initial intersection 902 and subsequent intersection 904 within the path length 808.

At 814, turn signal assignment system 550 extracts lane connectors (e.g., path information 804) from the intersections over path 802 (e.g., initial intersection 902 and subsequent intersection 904) within the path length 808. For example, turn signal assignment system 550 extracts lane connector 916 (also referred to herein as connector 916) and lane connector 906 (also referred to herein as connector 906), among other connectors.

At 816, turn signal assignment system 550 removes any false positives from intersections (e.g., intersections over path 802) before the intersection (e.g., subsequent intersection 904) where ego (e.g., vehicle 702) is turning. For example, turn signal assignment system 550 identifies initial intersection 902 as an intervening intersection within the path length 808 (e.g., signaling interval) prior to subsequent intersection 904. Based at least on the identification, turn signal assignment system 550 removes initial intersection 902 as a false positive. In other words, turn signal assignment system 550 determines to not activate intersection-based turn signal 524 until after vehicle 702 crosses and exits initial intersection 902.

At 818, turn signal assignment system 550 removes lane connectors outside the query range. For example, turn signal assignment system 550 removes connector 916 associated with initial intersection 902 that has been removed as a false positive. Accordingly, turn signal assignment system 550 determines to not activate intersection-based turn signal 524 until after vehicle 702 crosses and exits connector 916 within initial intersection 902.

At 820, turn signal assignment system 550 extracts a turn signal direction from a first lane connector remaining after removal of lane connectors outside the query range, and within the path length 808 (e.g., signaling interval). In the example shown in FIG. 9, turn signal assignment system 550 extracts the turn signal direction from the first lane connector (e.g., connector 906) remaining along path length 808 after removal of connector 916.

At 822, turn signal assignment system 550 activates intersection-based turn signal 524. For example, turn signal assignment system 550 transmits a control signal to vehicle 702 to activate the intersection-based turn signal 524 at the determined time. In an embodiment, turn signal assignment system 550 transmits the control signal to vehicle 702 to activate the intersection-based turn signal 524 after vehicle 702 passes initial intersection 902.

Referring back to FIG. 5, at 514, turn signal assignment system 550 has activated or not activated a turn signal (e.g., the steering-based turn signal 516, the lane-based turn signal 518, the trajectory-based turn signal 520, the parking-based turn signal 522, and/or the intersection-based turn signal). Accordingly, turn signal assignment system 550 ends the hierarchical determination of the plurality of ordered determinations in the priority order.

Figure 11:
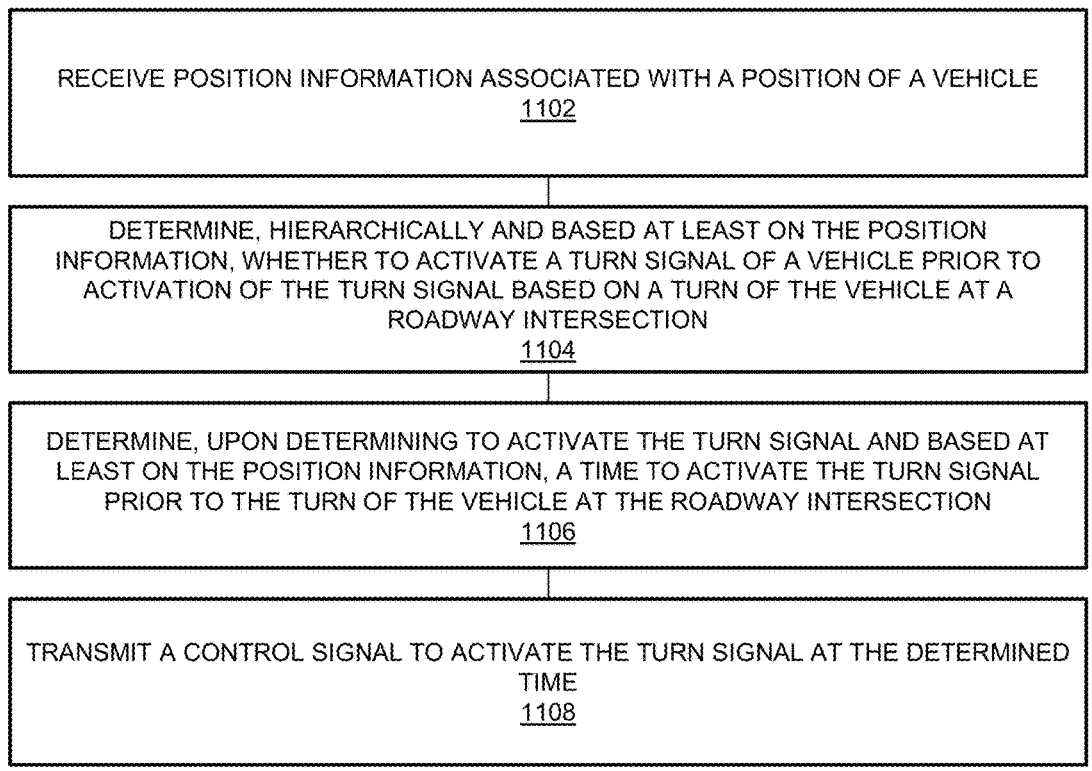
FIG. 11 is a flowchart of a process for turn signal assignment in complex maneuvers.

Referring now to FIG. 11, illustrated is a flowchart of a process 1100 for turn signal assignment in complex maneuvers. In some embodiments, one or more of the steps described with respect to process 1100 are performed (e.g., completely, partially, and/or the like) by turn signal assignment system 550. Additionally, or alternatively, in some embodiments one or more steps described with respect to process 1100 are performed (e.g., completely, partially, and/or the like) by another device or group of devices separate from or including turn signal assignment system 550.

At 1102, at least one processor (e.g., turn signal assignment system 550) receives position information associated with a position of a vehicle (e.g., vehicle 102 and/or vehicle 200). The position information can include a heading direction of the vehicle, a trajectory of the vehicle (e.g., a lateral trajectory of the vehicle), a descriptor associated with the trajectory, and/or the like. The heading direction includes a direction the vehicle is pointing or the direction of the steering angle. The lateral trajectory includes an upcoming trajectory, path, a side-to-side projected path, and/or the like. The descriptor includes a homotopy word or a high level descriptor of the trajectory of the vehicle, such as "Homotopy::allow_lane_change=true" or "Homotopy::allow_lane_change=false".

At 1104, the at least one processor hierarchically determines, based at least on the position information, whether to activate a turn signal of a vehicle prior to activation of the turn signal based on a turn (e.g., a change in direction) of the vehicle at a roadway intersection, such as an intersection of two or more lanes. The hierarchical determination includes a plurality of ordered determinations. The turn signal includes a signal for turning of the vehicle operated by a device on the vehicle. Activation of the turn signal includes changing the turn signal from on to off or off to on.

For example, determining whether to activate the turn signal can include determining an angle between the heading direction and a reference path is less than a threshold angle. The reference path includes center of a lane on the roadway, a baseline, etc. The threshold angle includes an angle of approximately 90 degrees or other predetermined threshold angles. If the angle is greater than the threshold, the turn signal is activated in a direction of the steering angle.

Determining whether to activate the turn signal can include determining the vehicle is not experiencing a lane change based on the descriptor. The lane change includes a change in a lane of a roadway in a left or right direction. If the descriptor indicates the vehicle is experiencing a change in the lane, the turn signal is activated in a direction based on a direction of the change in the lane. The vehicle is determined to not experience the lane change after determining the angle is less than the threshold angle.

Determining whether to activate the turn signal can include determining a deviation (e.g., a distance) between the lateral trajectory and the reference path is less than a threshold deviation (e.g., 1 to 2 m, 2 to 3 m, or the like). If the deviation meets the threshold deviation, the turn signal is activated based on a direction of the trajectory. Also, if the deviation meets the threshold deviation, and then a subsequent deviation is detected in the opposite direction, the turn signal is activated in the opposite direction. The deviation is determined to be less than the threshold deviation after determining the angle is less than the threshold angle and determining the vehicle is not experiencing the lane change.

Determining whether to activate the turn signal can include determining a distance from a destination parking spot (e.g., a predetermined parking spot, parking lot, and/or the like at the destination of the vehicle) and/or a pick up-drop off zone (e.g., a predetermined pick up-drop off zone at the destination of the vehicle) is greater than a threshold distance (e.g., 1 to 2 m, 2 to 3 m, 3 to 4 m, 4 to 5 m, or the like). If the distance meets the threshold distance, the turn signal is activated based on a relative position of the vehicle compared to the destination parking spot or pick up-drop off zone, or a lane index and locality driving direction. The distance is determined to be greater than the threshold distance after determining the deviation is less than the threshold deviation, determining the angle is less than the threshold angle, and determining the vehicle is not experiencing the lane change.

At 1106, the at least one data processor determines a time to activate the turn signal prior to the turn of the vehicle at the roadway intersection. The at least one data processor determines the time to active the turn signal upon determining to activate the turn signal. The at least one data processor additionally and/or alternatively determines the time to activate the turn signal based at least on the position information. For example, determining the time to activate the turn signal can include: extracting, based on the position information, an upcoming path of the vehicle. The upcoming path includes the roadway intersection and an initial roadway intersection prior to the roadway intersection. Determining the time to activate the turn signal additionally and/or alternatively includes: detecting the roadway intersection is after the initial roadway intersection. Determining the time to activate the turn signal additionally and/or alternatively includes delaying the time to activate the turn signal until after the vehicle exits the initial roadway intersection.

At 1108, the at least one data processor transmits a control signal to activate the turn signal at the determined time. The at least one data processor can transmit a second control signal to deactivate the turn signal after detecting the turn has been completed.

According to some non-limiting embodiments or examples, provided is a system comprising at least one processor; and at least one memory storing instructions thereon that, when executed by the at least one processor, result in operations comprising: receiving position information associated with a position of a vehicle; determining, hierarchically and based at least on the position information, whether to activate a turn signal of a vehicle prior to activation of the turn signal based on a turn of the vehicle at a roadway intersection; determining a time to activate the turn signal prior to the turn of the vehicle at the roadway intersection; and transmitting a control signal to activate the turn signal at the determined time.

According to some non-limiting embodiments or examples, provided is at least one non-transitory computer-readable medium comprising one or more instructions that, when executed by at least one processor, cause the at least one processor to: receive position information associated with a position of a vehicle; determine, hierarchically and based at least on the position information, whether to activate a turn signal of a vehicle prior to activation of the turn signal based on a turn of the vehicle at a roadway intersection; determine a time to activate the turn signal prior to the turn of the vehicle at the roadway intersection; and transmit a control signal to activate the turn signal at the determined time.

According to some non-limiting embodiments or examples, provided is a method, comprising: receiving position information associated with a position of a vehicle; determining, hierarchically and based at least on the position information, whether to activate a turn signal of a vehicle prior to activation of the turn signal based on a turn of the vehicle at a roadway intersection; determining a time to activate the turn signal prior to the turn of the vehicle at the roadway intersection; and transmitting a control signal to activate the turn signal at the determined time.

Further non-limiting aspects or embodiments are set forth in the following numbered clauses:

Clause 1: A system comprising: at least one processor; and at least one memory storing instructions thereon that, when executed by the at least one processor, result in operations comprising: receiving position information associated with a position of a vehicle; determining, hierarchically and based at least on the position information, whether to activate a turn signal of a vehicle prior to activation of the turn signal based on a turn of the vehicle at a roadway intersection; determining, upon determining to activate the turn signal and based at least on the position information, a time to activate the turn signal prior to the turn of the vehicle at the roadway intersection; and transmitting a control signal to activate the turn signal at the determined time.

Clause 2: The system of clause 1, wherein the position information comprises a heading direction of the vehicle; and wherein determining whether to activate the turn signal comprises: determining an angle between the heading direction and a reference path is less than a threshold angle.

Clause 3: The system of clause 2, wherein the position information further comprises a descriptor; and wherein determining whether to activate the turn signal further comprises: determining the vehicle is not experiencing a lane change based on the descriptor.

Clause 4: The system of clause 3, wherein the vehicle is determined to not experience the lane change after determining the angle is less than the threshold angle.

Clause 5: The system of clause 3, wherein the position information further comprises a lateral trajectory; and wherein determining whether to activate the turn signal further comprises: determining a deviation between the lateral trajectory and the reference path is less than a threshold deviation.

Clause 6: The system of clause 5, wherein the deviation is determined to be less than the threshold deviation after determining the angle is less than the threshold angle and determining the vehicle is not experiencing the lane change.

Clause 7: The system of clause 5, wherein the determining whether to activate the turn signal further comprises: determining a distance from a destination parking spot and/or a pick up-drop off zone is greater than a threshold distance.

Clause 8: The system of clause 7, wherein the distance is determined to be greater than the threshold distance after determining the deviation is less than the threshold deviation, determining the angle is less than the threshold angle, and determining the vehicle is not experiencing the lane change.

Clause 9: The system of any one of clauses 1 to 8, wherein the determining the time to activate the turn signal comprises: extracting, based on the position information, an upcoming path of the vehicle, wherein the upcoming path comprises the roadway intersection and an initial roadway intersection prior to the roadway intersection.

Clause 10: The system of clause 9, wherein determining the time to activate the turn signal comprises: detecting the roadway intersection is after the initial roadway intersection; and delaying the time to activate the turn signal until after the vehicle exits the initial roadway intersection.

Clause 11: The system of any one of clauses 1 to 10, wherein the operations further comprise: transmitting a second control signal to deactivate the turn signal after detecting the turn has been completed.

Clause 12: The system of any one of clauses 1 to 11, wherein the hierarchical determination includes a plurality of ordered determinations.

Clause 13: A method comprising: receiving position information associated with a position of a vehicle; determining, hierarchically and based at least on the position information, whether to activate a turn signal of a vehicle prior to activation of the turn signal based on a turn of the vehicle at a roadway intersection; determining, upon determining to activate the turn signal and based at least on the position information, a time to activate the turn signal prior to the turn of the vehicle at the roadway intersection; and transmitting a control signal to activate the turn signal at the determined time.

Clause 14: The method of clause 13, wherein the position information comprises a heading direction of the vehicle; and wherein determining whether to activate the turn signal comprises: determining an angle between the heading direction and a reference path is less than a threshold angle.

Clause 15: The method of clause 14, wherein the position information further comprises a descriptor; and wherein determining whether to activate the turn signal further comprises: determining the vehicle is not experiencing a lane change based on the descriptor.

Clause 16: The method of clause 15, wherein the vehicle is determined to not experience the lane change after determining the angle is less than the threshold angle.

Clause 17: The method of clause 15, wherein the position information further comprises a lateral trajectory; and wherein determining whether to activate the turn signal further comprises: determining a deviation between the lateral trajectory and the reference path is less than a threshold deviation.

Clause 18: The method of clause 17, wherein the deviation is determined to be less than the threshold deviation after determining the angle is less than the threshold angle and determining the vehicle is not experiencing the lane change.

Clause 19: The method of clause 17, wherein the determining whether to activate the turn signal further comprises: determining a distance from a destination parking spot and/or a pick up-drop off zone is greater than a threshold distance.

Clause 20: At least one non-transitory storage media storing instructions that, when executed by at least one processor, cause the at least one processor to: receive position information associated with a position of a vehicle; determine, hierarchically and based at least on the position information, whether to activate a turn signal of a vehicle prior to activation of the turn signal based on a turn of the vehicle at a roadway intersection; determine, upon determining to activate the turn signal and based at least on the position information, a time to activate the turn signal prior to the turn of the vehicle at the roadway intersection; and transmit a control signal to activate the turn signal at the determined time.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
   at least one processor; and
   at least one memory storing instructions thereon that, when executed by the at least one processor, result in operations comprising:
   receiving position information associated with a position of a vehicle;
   hierarchically determining whether to activate a turn signal of the vehicle prior to activation of the turn signal based on a turn of the vehicle at a roadway intersection using a plurality of ordered determinations based on the position information, wherein a first determination of the plurality of ordered determinations is associated with activating the turn signal by assigning a steering-based turn signal based on a positive determination of the first determination, a second determination is associated with activating the turn signal by assigning a lane-based turn signal based on a negative determination of the first determination and a positive determination of the second determination, and a third determination is associated with activating the turn signal by assigning a trajectory-based turn signal based on a negative determination of the second determination and a positive determination of the third determination;
   determining, upon hierarchically determining to activate the turn signal and based at least on the position information, a time to activate the turn signal prior to the turn of the vehicle at the roadway intersection; and
   transmitting a control signal to activate the turn signal of the vehicle at the determined time.

2. The system of claim 1, wherein the position information comprises a heading direction of the vehicle, and wherein hierarchically determining whether to activate the turn signal comprises: determining an angle between the heading direction and a reference path is less than a threshold angle.

3. The system of claim 2, wherein the position information further comprises a descriptor, and wherein hierarchically determining whether to activate the turn signal further comprises: determining the vehicle is not experiencing a lane change based on the descriptor.

4. The system of claim 3, wherein the vehicle is determined to not experience the lane change after determining the angle is less than the threshold angle.

5. The system of claim 3, wherein the position information further comprises a lateral trajectory, and wherein hierarchically determining whether to activate the turn signal further comprises: determining a deviation between the lateral trajectory and the reference path is less than a threshold deviation.

6. The system of claim 5, wherein the deviation is determined to be less than the threshold deviation after determining the angle is less than the threshold angle and determining the vehicle is not experiencing the lane change.

7. The system of claim 5, wherein the hierarchically determining whether to activate the turn signal further comprises: determining a distance from a destination parking spot and/or a pick up-drop off zone is greater than a threshold distance.

8. The system of claim 7, wherein the distance is determined to be greater than the threshold distance after determining the deviation is less than the threshold deviation, determining the angle is less than the threshold angle, and determining the vehicle is not experiencing the lane change.

9. The system of claim 1, wherein the determining the time to activate the turn signal comprises: extracting, based on the position information, an upcoming path of the vehicle, wherein the upcoming path comprises the roadway intersection and an initial roadway intersection prior to the roadway intersection.

10. The system of claim 9, wherein determining the time to activate the turn signal comprises: detecting the roadway intersection is after the initial roadway intersection; and delaying the time to activate the turn signal until after the vehicle exits the initial roadway intersection.

11. The system of claim 1, wherein the operations further comprise: transmitting a second control signal to deactivate the turn signal after detecting the turn has been completed.

12. The system of claim 1, wherein the plurality of ordered determinations comprises a fourth determination associated with activating the turn signal by assigning a parking-based turn signal based on a negative determination of the third determination and a positive determination of the fourth determination, and a fifth determination associated with activating the turn signal by assigning an intersection-based turn signal based on a negative determination of the fourth determination and a positive determination of the fifth determination.

13. A method executed by a processor of a vehicle comprising:
receiving position information associated with a position of the vehicle;
hierarchically determining whether to activate a turn signal of the vehicle prior to activation of the turn signal based on a turn of the vehicle at a roadway intersection using a plurality of ordered determinations based on the position information, wherein a first determination of the plurality of ordered determinations is associated with activating the turn signal by assigning a steering-based turn signal based on a positive determination of the first determination, a second determination is associated with activating the turn signal by assigning a lane-based turn signal based on a negative determination of the first determination and a positive determination of the second determination, and a third determination is associated with activating the turn signal by assigning a trajectory-based turn signal based on a negative determination of the second determination and a positive determination of the third determination;
determining, upon hierarchically determining to activate the turn signal and based at least on the position information, a time to activate the turn signal prior to the turn of the vehicle at the roadway intersection; and
transmitting a control signal to activate the turn signal of the vehicle at the determined time.

14. The method of claim 13, wherein the position information comprises a heading direction of the vehicle, and wherein hierarchically determining whether to activate the turn signal comprises: determining an angle between the heading direction and a reference path is less than a threshold angle.

15. The method of claim 14, wherein the position information further comprises a descriptor, and wherein hierarchically determining whether to activate the turn signal further comprises: determining the vehicle is not experiencing a lane change based on the descriptor.

16. The method of claim 15, wherein the vehicle is determined to not experience the lane change after determining the angle is less than the threshold angle.

17. The method of claim 15, wherein the position information further comprises a lateral trajectory, and wherein hierarchically determining whether to activate the turn signal further comprises: determining a deviation between the lateral trajectory and the reference path is less than a threshold deviation.

18. The method of claim 17, wherein the deviation is determined to be less than the threshold deviation after determining the angle is less than the threshold angle and determining the vehicle is not experiencing the lane change.

19. The method of claim 17, wherein the hierarchically determining whether to activate the turn signal further comprises: determining a distance from a destination parking spot and/or a pick up-drop off zone is greater than a threshold distance.

20. At least one non-transitory storage media storing instructions that, when executed by at least one processor, cause the at least one processor to:
receive position information associated with a position of a vehicle;
hierarchically determine whether to activate a turn signal of the vehicle prior to activation of the turn signal based on a turn of the vehicle at a roadway intersection using a plurality of ordered determinations based on the position information, wherein a first determination of the plurality of ordered determinations is associated with activating the turn signal by assigning a steering-based turn signal based on a positive determination of the first determination, a second determination is associated with activating the turn signal by assigning a lane-based turn signal based on a negative determination of the first determination and a positive determination of the second determination, and a third determination is associated with activating the turn signal by assigning a trajectory-based turn signal based on a negative determination of the second determination and a positive determination of the third determination;

determine, upon hierarchically determining to activate the turn signal and based at least on the position information, a time to activate the turn signal prior to the turn of the vehicle at the roadway intersection; and transmit a control signal to activate the turn signal of the vehicle at the determined time.

\* \* \* \* \*